(12) United States Patent
Tocchio et al.

(10) Patent No.: US 11,408,904 B2
(45) Date of Patent: Aug. 9, 2022

(54) ACCELEROMETRIC SENSOR IN MEMS TECHNOLOGY HAVING HIGH ACCURACY AND LOW SENSITIVITY TO TEMPERATURE AND AGEING

(71) Applicant: STMICROELECTRONICS S.r.l., Agrate Brianza (IT)

(72) Inventors: Alessandro Tocchio, Milan (IT); Francesco Rizzini, Passirano (IT); Carlo Valzasina, Gessate (IT); Giacomo Langfelder, Milan (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 106 days.

(21) Appl. No.: 16/726,024

(22) Filed: Dec. 23, 2019

(65) Prior Publication Data

US 2020/0132711 A1    Apr. 30, 2020

Related U.S. Application Data

(62) Division of application No. 15/280,720, filed on Sep. 29, 2016, now Pat. No. 10,591,505.

(30) Foreign Application Priority Data

Mar. 31, 2016   (IT) .................. 102016000033296

(51) Int. Cl.
*G01P 15/00*   (2006.01)
*G01P 1/00*    (2006.01)
(Continued)

(52) U.S. Cl.
CPC ............ *G01P 1/006* (2013.01); *G01P 15/125* (2013.01); *G01P 2015/0817* (2013.01); *G01P 2015/0834* (2013.01)

(58) Field of Classification Search
CPC .......................... G01P 2015/084; G01P 15/135
See application file for complete search history.

(56) References Cited

U.S. PATENT DOCUMENTS

| 4,599,896 A | 7/1986 | Stewart |
| 5,895,850 A | 4/1999 | Buestgens |
| (Continued) | | |

FOREIGN PATENT DOCUMENTS

| CN | 1844935 A | 10/2006 |
| CN | 101089624 A | 12/2007 |
| (Continued) | | |

OTHER PUBLICATIONS

Caspani, A. et al., "A differential resonant micro accelerometer for out-of-plane measurements," Procedia Engineering, vol. 87, pp. 640-643, 2014.

*Primary Examiner* — Tran M. Tran
(74) *Attorney, Agent, or Firm* — Seed IP Law Group LLP (57) ABSTRACT

The accelerometric sensor has a suspended region, mobile with respect to a supporting structure, and a sensing assembly coupled to the suspended region and configured to detect a movement of the suspended region with respect to the supporting structure. The suspended region has a geometry variable between at least two configurations associated with respective centroids, different from each other. The suspended region is formed by a first region rotatably anchored to the supporting structure and by a second region coupled to the first region through elastic connection elements configured to allow a relative movement of the second region with respect to the first region. A driving assembly is coupled to the second region so as to control the relative movement of the latter with respect to the first region.

22 Claims, 5 Drawing Sheets

(51) Int. Cl.
*G01P 15/125* (2006.01)
*G01P 15/08* (2006.01)

(56) References Cited

U.S. PATENT DOCUMENTS

| | | | |
|---|---|---|---|
| 6,044,705 A | 4/2000 | Neukermans et al. | |
| 6,481,283 B1 | 11/2002 | Cardarelli | |
| 6,539,803 B2 | 4/2003 | Mochida | |
| 6,584,845 B1 | 7/2003 | Gutierrez et al. | |
| 6,691,571 B2 | 2/2004 | Willig et al. | |
| 6,823,734 B1 * | 11/2004 | Hayworth | B81B 3/0062 |
| | | | 73/504.12 |
| 6,843,127 B1 * | 1/2005 | Chiou | G01C 19/5719 |
| | | | 73/504.12 |
| 6,845,669 B2 | 1/2005 | Acar et al. | |
| 6,860,150 B2 | 3/2005 | Cho | |
| 6,955,086 B2 | 10/2005 | Yoshikawa et al. | |
| 7,066,004 B1 | 6/2006 | Kohler et al. | |
| 7,100,444 B2 * | 9/2006 | Challoner | G01C 19/5719 |
| | | | 73/504.02 |
| 7,159,441 B2 * | 1/2007 | Challoner | G01C 19/56 |
| | | | 73/1.77 |
| 7,426,861 B2 | 9/2008 | Weinberg et al. | |
| 7,513,155 B2 | 4/2009 | Jeong et al. | |
| 7,617,728 B2 * | 11/2009 | Cardarelli | G01C 19/5719 |
| | | | 73/504.16 |
| 7,640,786 B2 | 1/2010 | Stewart | |
| 7,694,563 B2 | 4/2010 | Durante et al. | |
| 7,797,998 B2 | 9/2010 | Menard et al. | |
| 8,042,396 B2 | 10/2011 | Coronato et al. | |
| 8,215,168 B2 | 7/2012 | Merz et al. | |
| 8,261,614 B2 | 9/2012 | Hartmann et al. | |
| 8,297,121 B2 | 10/2012 | Quer et al. | |
| 8,342,022 B2 | 1/2013 | Schmid et al. | |
| 8,342,025 B2 * | 1/2013 | Coronato | G01C 19/5747 |
| | | | 73/504.14 |
| 8,365,597 B2 | 2/2013 | Akashi et al. | |
| 8,459,110 B2 | 6/2013 | Cazzaniga et al. | |
| 8,539,832 B2 | 9/2013 | Potasek et al. | |
| 8,539,835 B2 | 9/2013 | Seeger et al. | |
| 8,549,917 B2 | 10/2013 | Cazzaniga et al. | |
| 8,621,928 B2 | 1/2014 | Gotoh | |
| 8,661,897 B2 | 3/2014 | Coronato et al. | |
| 8,733,172 B2 | 5/2014 | Coronato et al. | |
| 8,833,164 B2 | 9/2014 | Coronato et al. | |
| 8,875,578 B2 | 11/2014 | Smith | |
| 8,950,257 B2 | 2/2015 | Cazzaniga et al. | |
| 9,010,184 B2 | 4/2015 | Zou et al. | |
| 9,075,079 B2 | 7/2015 | Yoneoka et al. | |
| 9,146,107 B2 * | 9/2015 | Kuhlmann | G01C 19/5712 |
| 9,151,611 B2 | 10/2015 | Coronato et al. | |
| 9,194,704 B2 | 11/2015 | Lin et al. | |
| RE45,855 E | 1/2016 | Coronato et al. | |
| 9,234,913 B2 | 1/2016 | Simoni et al. | |
| 9,310,199 B2 * | 4/2016 | Schofield | G01C 19/5733 |
| 9,310,202 B2 | 4/2016 | Lin | |
| 9,341,646 B2 | 5/2016 | Stewart | |
| 9,389,077 B2 | 7/2016 | Comi et al. | |
| 9,404,747 B2 | 8/2016 | Valzasina et al. | |
| 9,453,927 B2 | 9/2016 | Heitz et al. | |
| 9,513,310 B2 * | 12/2016 | Baldasarre | G01P 15/125 |
| 9,651,375 B2 | 5/2017 | Kuhlmann et al. | |
| 9,664,515 B2 * | 5/2017 | Rocchi | G01P 15/097 |
| 9,689,677 B2 | 6/2017 | Shao et al. | |
| 9,696,157 B2 | 7/2017 | Falomi et al. | |
| 9,746,489 B2 * | 8/2017 | Takizawa | G01C 19/5733 |
| 9,878,903 B2 | 1/2018 | Lasalandra et al. | |
| 9,958,270 B2 | 5/2018 | Blomqvist | |
| 9,989,364 B2 | 6/2018 | Comi et al. | |
| 10,119,823 B2 * | 11/2018 | Takizawa | G01C 19/574 |
| 10,168,154 B2 * | 1/2019 | Cazzaniga | G01P 9/02 |
| 10,502,568 B2 * | 12/2019 | Zotov | G01C 19/5684 |
| 10,634,696 B2 * | 4/2020 | Mohammed | G01C 19/5712 |
| 10,712,359 B2 * | 7/2020 | McNeil | B81B 3/007 |
| 2002/0134154 A1 * | 9/2002 | Hsu | G01C 19/5719 |
| | | | 73/504.04 |
| 2006/0021436 A1 * | 2/2006 | Kapser | G01P 15/125 |
| | | | 73/514.38 |
| 2006/0112764 A1 | 6/2006 | Higuchi | |
| 2008/0236242 A1 | 10/2008 | Stewart | |
| 2008/0237757 A1 | 10/2008 | Inoue et al. | |
| 2014/0116136 A1 | 5/2014 | Coronato et al. | |
| 2017/0261322 A1 | 9/2017 | Gattere et al. | |
| 2017/0284804 A1 | 10/2017 | Gattere et al. | |
| 2018/0031603 A1 * | 2/2018 | Huang | G01P 15/14 |

FOREIGN PATENT DOCUMENTS

| | | |
|---|---|---|
| CN | 101270988 A | 9/2008 |
| EP | 0390721 A1 | 10/1990 |
| EP | 1 975 631 A2 | 10/2008 |
| WO | WO 03031317 A2 | 4/2003 |

* cited by examiner

ACCELEROMETRIC SENSOR IN MEMS TECHNOLOGY HAVING HIGH ACCURACY AND LOW SENSITIVITY TO TEMPERATURE AND AGEING

BACKGROUND

Technical Field

The present disclosure relates to an accelerometric sensor in MEMS technology having high accuracy and low sensitivity to temperature and ageing.

Description of the Related Art

As is known, an accelerometric sensor or accelerometer is an inertial sensor that converts an acceleration into an electrical signal. An accelerometric sensor in MEMS (Micro-Electro-Mechanical System) technology is basically formed by a mobile structure and a detecting system, coupled to the mobile structure and generating a corresponding electrical signal (for example, a capacitive variation) supplied to a processing interface.

Figure 1:
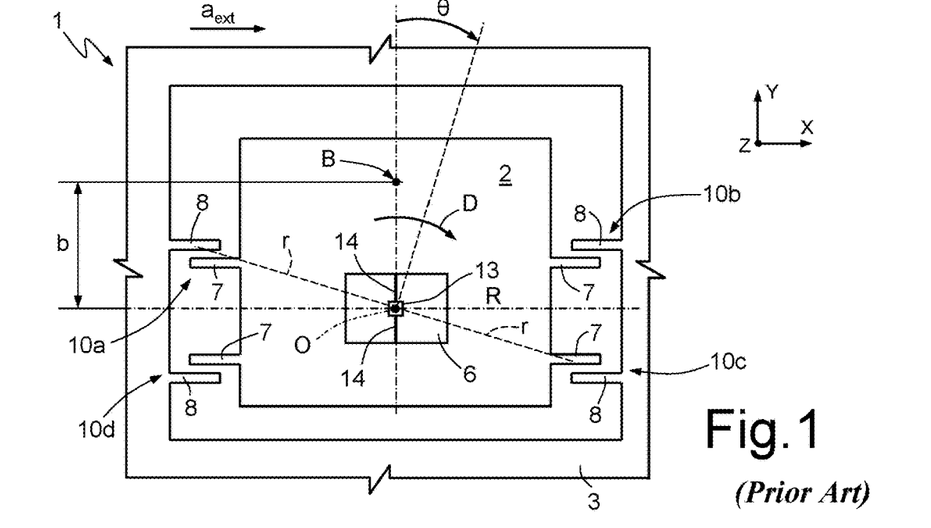
FIG. 1 is a schematic view of a known accelerometer, for detecting in-plane accelerations.

FIG. 1 is, for example, a schematic illustration of the structure of a known MEMS acceleration sensor for detecting in-plane accelerations. Here, the sensor, designated as a whole by 1, is a uniaxial sensor and has the function of detecting an acceleration, indicated by the arrow $a_{ext}$, parallel to a Cartesian axis (here axis X of a Cartesian system XYZ).

The sensor 1 comprises a suspended region 2, typically of monocrystalline or polycrystalline silicon, eccentrically anchored to a fixed region 3 (only a portion surrounding the suspended mass 2 being visible in FIG. 1) via an anchorage 13 and elastic suspension elements, also referred to as "springs 14". In the example illustrated, the suspended region 2 has a rectangular shape in top plan view (in plane XY), with sides parallel to axes X and Y, and a thickness in direction Z, perpendicular to the drawing plane, smaller than its dimensions in directions X and Y.

The anchorage 13 is substantially formed by a column, extending in a perpendicular direction to the drawing plane (parallel to axis Z) from a substrate (not visible), which forms part of the fixed region 3 and extends underneath the suspended region. The anchorage 13 defines a rotation axis O for the suspended region 2. Here, the rotation axis O is eccentric with respect to a center of mass (centroid) B of the suspended mass 2. Specifically, the rotation axis O is shifted along axis Y with respect to the centroid B by an arm b. The anchorage 13 extends in an opening 6 in the suspended region 2. The springs 14, coplanar to the suspended region 2, extend through the opening 6, here parallel to axis Y, between the anchorage 13 and two opposite points (along axis Y) of the opening 6. The springs 14, in a per se known manner, are shaped so as to allow rotation of the suspended region 2 only about the rotation axis O.

Mobile electrodes 7 are formed by, or fixed with respect to, the suspended region 2 and face fixed electrodes 8, in turn fixed to, or formed by, the fixed region 3. The number, position, and shape of the mobile electrodes 7 and of the fixed electrodes 8 may change. In the example illustrated, four fixed electrodes 8 are arranged on the sides of the suspended region 2, parallel to axis X, and face respective four mobile electrodes 7 so as to form four electrode pairs 10a, 10b, 10c, and 10d. Furthermore, here the electrode pairs 10a-10d are arranged, two by two, in two half-planes defined by a plane parallel to the plane XZ, of trace R, passing through rotation axis O. All fixed electrodes 8 are equidistant from rotation axis O (r being the distance between the center of each fixed electrode 8 and rotation axis O).

Each electrode pair 10a-10d defines a capacitive element, the capacitance C whereof depends upon the distance between the respective fixed and mobile electrodes 8, 7, which face each other, and thus upon the position of the suspended region 2, as discussed in detail hereinafter.

By virtue of the eccentricity of the rotation axis O with respect to the centroid B, in presence of an external acceleration $a_{ext}$ directed or having a component directed along axis X, the mobile mass 2 turns about the rotation axis O, as indicated in the figure by the arrow D, causing a relative movement of the mobile electrodes 7 away from the corresponding fixed electrodes 8 of two electrodes pairs arranged diametrally opposite (in the drawing, pairs 10b, 10d), and a corresponding approaching of the mobile electrodes 7 to the corresponding fixed electrodes 8 of the other two pairs (here, the pairs 10a, 10c). It follows that the electrode pairs 10b, 10d undergo a reduction of capacitance, and the electrode pairs 10a, 10c undergo a corresponding increase of capacitance.

The law that links the rotation angle θ of the suspended region 2 to an external acceleration $a_{ext}$ in the direction X (or to the component in direction X of a generic external acceleration) can be calculated on the basis of the harmonic motion equation for a rotating body, neglecting the damping components.

In particular, $$k\theta = M_{ext} = F_{ext} \cdot b = m \cdot a_{ext} \cdot b$$

where $M_{ext}$ and $F_{ext}$ are, respectively, the moment and force exerted by the external acceleration $a_{ext}$ on the suspended region 2, m is the mass of the suspended region 2, b is the arm or distance between the rotation axis O and the centroid B, and k is the elasticity of the springs 14.

The rotation angle θ is thus given by $$\theta = \frac{m \cdot a_{ext} \cdot b}{k} \quad (1)$$

Furthermore, indicating by $\varepsilon_O$ the vacuum permittivity, A the facing area between the fixed electrodes 8 and the mobile electrodes 7 of each electrode pair 10a-10c, $g_0$ the rest distance between each mobile electrode 7 and the respective fixed electrode 8, r the distance between the center of each fixed electrode 8 and rotation axis O, C1 the capacitance associated with electrodes 7, 8 that are moving away from each other (here the pairs 10a, 10c), and C2 the capacitance associated with electrodes 7, 8 that are getting closer to each other (here the pairs 10b, 10d), and by approximating r sin θ by rθ, it results:

$$C_1 = \frac{\varepsilon_0 A}{(g_0 - r\theta)} \quad C_1 = \frac{\varepsilon_0 A}{(g_0 - r\theta)} \quad (2)$$

$$C_2 = \frac{\varepsilon_0 A}{(g_0 - r\theta)} \quad (3)$$

Subtracting capacitances $C_1$ and $C_2$, a capacitive variation ΔC caused by the external acceleration $a_{ext}$ is obtained:

$$\Delta C = C_2 - C_1 \quad (4)$$

By combining Eqs. (1)-(4), it is possible to derive the external acceleration $a_{ext}$ as a function $\Delta C$ in the case of small angles $r\theta < g_0$ $$\Delta C = 2 \frac{\varepsilon_0 A}{g_0^2} r \frac{m \cdot a_{ext} \cdot b}{k}$$

Thus, by appropriately biasing the mobile and fixed electrodes 7, 8, and connecting them electrically to a downstream processing circuit (for example, an ASIC—Application-Specific Integrated Circuit) it is possible to obtain, after possible amplification and filtering, an output voltage signal $\Delta V$ proportional to the sought acceleration value $a_{ext}$.

With this technique, it is not possible, however, to electronically distinguish the effects due to the external acceleration from the spurious ones due, for example, to stresses caused by variations of environmental conditions, such as temperature and humidity, or by structural modifications (such as bending) caused by external structures (for example, by the package enclosing the sensor) or by ageing phenomena of the materials. The above phenomena may cause low-frequency or dc capacitive variations that cannot be electronically distinguished from the useful signal.

In fact, in presence of stresses, Eq. (2) and Eq. (3) become $$C_1 = \frac{\varepsilon_0 A}{(g_0 - r\theta + \Delta y2)} \quad C_1 = \frac{\varepsilon_0 A}{(g_0 - r\theta + \Delta y2)} \quad (2')$$

$$C_2 = \frac{\varepsilon_0 A}{(g_0 + r\theta + \Delta y1)} \quad C_2 = \frac{\varepsilon_0 A}{(g_0 + r\theta + \Delta y1)} \quad (3')$$

where $\Delta y_1$ and $\Delta y_2$ are the distance variation, along axis y, between each mobile electrode 7 and the corresponding fixed electrode 8, due to the displacement caused by spurious stresses.

It follows that the measured capacitance variation becomes $$\Delta C' = \Delta C + \Delta C_{stress} \quad (4')$$

where $\Delta C_{stress}$ is the capacitance variation due to spurious stresses.

To prevent errors due to stresses, solutions have been proposed based upon different spatial configurations of the sensor aimed at reducing the causes of the spurious signals or at reducing the structure sensitivity to stresses, without, however, eliminating them completely or eliminating their effects.

BRIEF SUMMARY

According to the present disclosure, an accelerometric sensor and a corresponding method for detecting an accelerometric signal are provided.

In practice, a solution is proposed that is able to frequency modulate the useful signal due to external accelerations so that it has a frequency other than zero and is thus distinguishable from the dc signals due to mechanical deformations or more in general to spurious stresses.

To this end, the present accelerometric sensor has a geometrically variable configuration of the suspended region such as to allow modulation of the sensing arm (distance between the rotation axis and the centroid of the suspended mass). The variable or modulated configuration of the accelerometric sensor is obtained by dividing the suspended region into two parts: a first region, supported to be mobile, for example to turn about the anchorage axis, and at least one second region, which is mobile, for example, translatable, with respect to the first region, so as to modulate the centroid of the suspended region. The variable geometry of the suspended mass allows a discrete-time or continuous-time signal to be obtained, at a frequency that can be set, such as to allow elimination of the signal due to stresses.

BRIEF DESCRIPTION OF THE SEVERAL
VIEWS OF THE DRAWINGS

For a better understanding of the present disclosure, preferred embodiments thereof are now described, purely by way of non-limiting example, with reference to the attached drawings, wherein.

DETAILED DESCRIPTION

Figure 2:
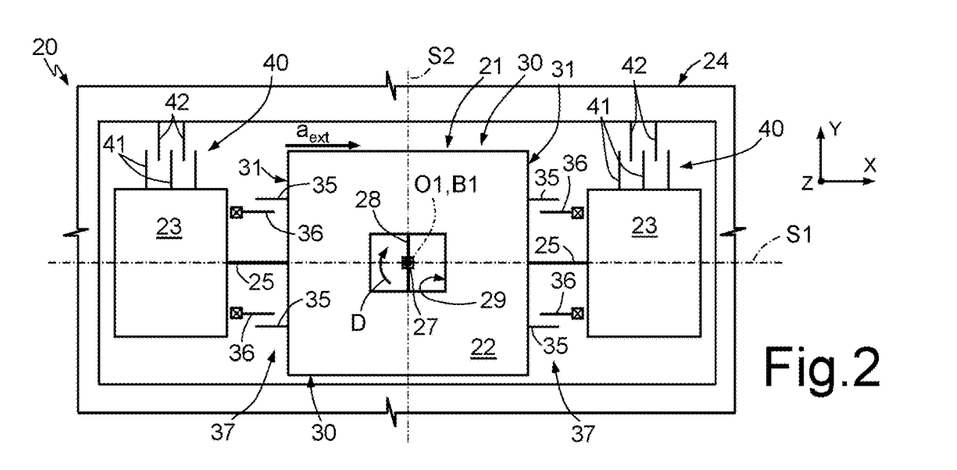
FIG. 2 is a schematic top plan view of an embodiment of the present accelerometer, for detecting in-plane accelerations, in a first operating position.

FIG. 2 is a schematic illustration of the structure of an embodiment of an accelerometer 20 designed for detecting external in-plane accelerations, made in MEMS technology. In the example illustrated, the accelerometer 20 is configured to detect accelerations directed parallel to an axis X belonging to a Cartesian reference system XYZ.

In detail, the accelerometer 20 is formed in a die of conductive material, typically of monocrystalline or polycrystalline silicon, comprising a supporting region 24 (typically fixed with respect to the die and is thus defined hereinafter also as "fixed region"), represented schematically in FIG. 2 and carrying a suspended region 21.

The suspended region 21 is here formed by three parts: a central region 22 and two lateral regions 23. The central region 22 and the lateral regions 23 are provided in a same semiconductor material layer, are monolithic with each other, and are suspended over a substrate (not shown) forming part of the supporting region 24. The lateral regions 23 are connected to the central region 22 through respective elastic connection regions 25 monolithic with the central region 22 and with the lateral regions 23, also suspended over the substrate (not shown). The suspended region 21 has a uniform thickness in direction Z, perpendicular to the drawing plane; moreover, the thickness of the suspended region 21 is much smaller than its dimensions in directions X and Y.

The central region 22 is anchored to the substrate (not shown) through an anchorage 27 and elastic suspension elements, also referred to as "springs 28".

The anchorage 27 is basically formed by a column extending perpendicularly to the drawing plane (parallel to axis Z) and terminates within an opening 29 in the central region 22. The anchorage 27 is connected to the suspended region 21 through the springs 28 and defines a rotation axis O1 for the suspended region 21.

Also the springs 28 extend through the opening 29, here parallel to axis Y, between the anchorage 27 and two opposite points (along axis Y) of the opening 29. The springs 28, in a per se known manner, are shaped so as to allow rotation of the suspended region 21 only about the rotation axis O1, as indicated by the arrow D.

In FIG. 2, the central region 22 has a rectangular shape in top plan view (in the plane XY), with a pair of first sides 30 parallel to axis X and a pair of second sides 31 parallel to axis Y.

In the accelerometer 20 of FIG. 2, the central region 22 has a symmetrical structure with respect to planes XZ, YZ passing through the rotation axis O1, the traces whereof in FIG. 2 are represented by a first axis Si (longitudinal symmetry axis at rest) and by a second axis S2 (transverse symmetry axis). Consequently, the central region 22 has a centroid B1 arranged along rotation axis O1.

Each elastic connection region 25 extends from a respective second side 31 of the central region 22, starting from median portions of these sides and extend, at rest, along first axis 51. The elastic connection regions 25 have the same shape; in particular, they have the same dimensions in directions X and Y.

Lateral regions 23 thus extend on the two second sides 31 of the central region 22 opposite to the second axis S2. Lateral regions 23 have the same shape and size. Here both of them have a rectangular shape and are connected to the elastic connection regions 25 so that, in the rest position of FIG. 2, they are arranged symmetrically to both axes 51, S2.

Consequently, at rest, the centroid B1 of the entire suspended structure 21 is the same as the centroid of the central region and lies along the rotation axis O1.

The central region 22 carries, on the second sides 31, mobile sensing electrodes 35, facing corresponding fixed sensing electrodes 36. As in FIG. 1, the mobile sensing electrodes 35 and fixed sensing electrodes 36 form capacitive sensing elements 37 whose capacitive variation is used for measuring external accelerations, as discussed in greater detail hereinafter.

Furthermore, the lateral regions 23 are each coupled to a respective driving assembly 40 designed to control displacement of the lateral regions 23 parallel to axis Y. In the illustrated example, each driving assembly 40 comprises mobile driving electrodes 41, which are fixed with respect to a respective lateral region 23, and fixed driving electrodes 42, which are fixed with respect to the supporting region 24. The mobile driving electrodes 41 and the fixed driving electrodes 42 are comb-fingered with respect to each other and extend parallel to the plane YZ. However, other driving modes are possible.

In addition, the elastic connection regions 25 are configured to allow a displacement of the lateral regions 23 substantially parallel to axis Y with respect to the central region 22.

Figure 3:
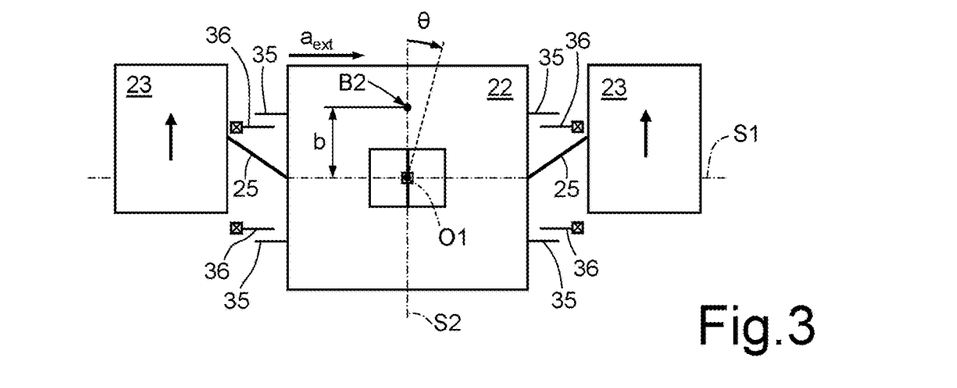
FIG. 3 is a schematic top plan view of the accelerometer of FIG. 2, in a second operating position.
Figure 4:
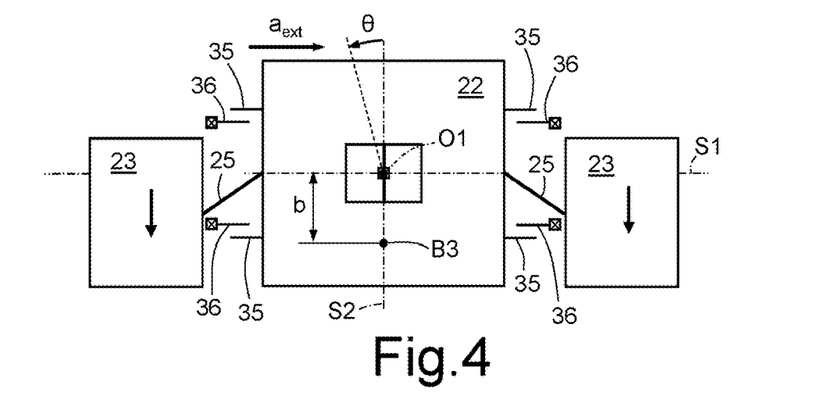
FIG. 4 is a schematic top plan view of the accelerometer of FIG. 2, in a different operating position.

By controlling the lateral regions 23 through the respective driving assemblies 40, it is possible to bring the suspended structure 21 from the rest position of FIG. 2, where, as said, the entire suspended structure 21 is arranged symmetrically with respect to the first axis 51 and has a centroid B1 on the rotation axis O1 (zero-arm position), into a first modulated-arm position, visible in FIG. 3 or in FIG. 4, where the lateral regions 23 are no longer in a symmetrical position with respect to the first axis 51, and thus the suspended structure 21 has a centroid B2 shifted with respect to the rotation axis O1 by an arm b.

Displacement of the lateral regions 23 allows discrimination of the capacitance variation associated with the capacitive sensing elements 37 and due to stress phenomena from the capacitance variation of the capacitive elements due to an external acceleration.

In particular, according to a sensing mode, the displacement of the lateral regions 23 is controlled in a discrete time mode, and an external processing system, via a capacitance/voltage converter interface, reads the signals generated by the capacitive sensing elements 37 in two distinct positions, for example, in the rest position (shown in FIG. 2) and in a measure position (for example, in the position of FIG. 3).

Specifically, with a reading of the signals generated by the capacitive sensing elements 37 in the rest position of the suspended region 21, since the centroidal axis coincides with the rotation axis, an external acceleration $a_{ext}$ does not bring about any rotation of the suspended region 21 about the rotation axis O1, and possible rotations thereof are only due to stress and cause a first capacitive variation $\Delta C_{o1}$ given by $\Delta C_{o1}$.

$$\Delta C_{o1} = \Delta C_{stress} \quad (5)$$

where $\Delta C_{stress}$ is the capacitive variation due only to stress.

In the measure position of FIG. 2 or 3, instead, due to eccentricity of the centroidal axis B2 with respect to the rotation axis O1, the suspended region 21 turns both as a result of the external acceleration $a_{ext}$ and as a result of the stresses. In this situation, the capacitance variation associated with the capacitive sensing elements 37 $\Delta C_{o2}$ $\Delta C_{o2}$ is given by $$\Delta C_{o2} = \Delta C_a + \Delta C_{stress} \quad (6)$$

(second capacitive variation), where $\Delta C_a$ is the capacitive variation due to the external acceleration $a_{ext}$.

By subtracting Eq. (5) from Eq. (6), a processing stage downstream of the accelerometer 20 is thus able to isolate just the capacitive variation $\Delta C_a$ due to the external acceleration $a_{ext}$ and, from this, in a known manner, to obtain the value of the external acceleration $a_{ext}$.

Figure 6:
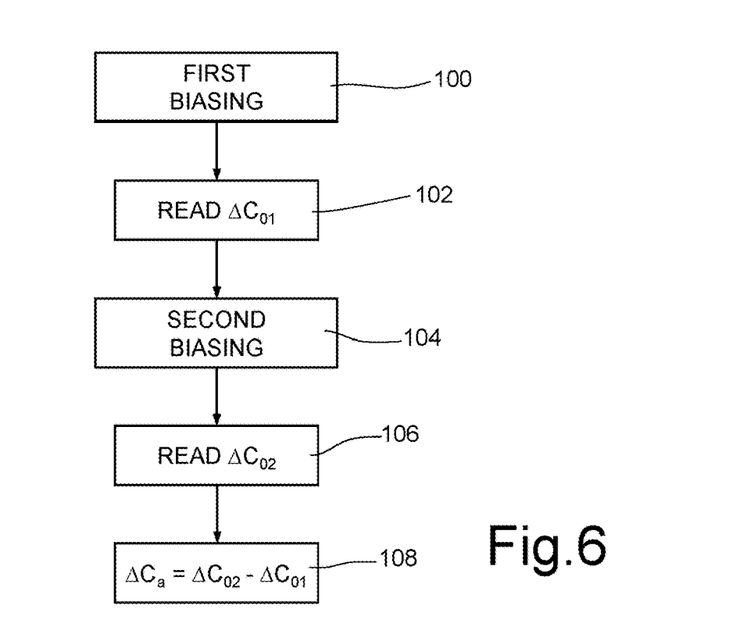
FIG. 6 is a flowchart of a possible processing of the signal supplied by the present accelerometer, in case of discrete-time detection.

Detection of the external acceleration $a_{ext}$ may thus be made in two steps, as shown in FIG. 6. In a first step (step 100) a first biasing voltage (for example, 0V) is applied, and, step 102, the first capacitive variation ΔCo1 is measured. In a second step (step 104), a second biasing voltage is applied, and (step 106) the second capacitive variation $\Delta C_{o2}$ is measured. Then, step 108, the first and second capacitive variations are subtracted from each other.

In this way, it is possible eliminate the effects of stress, which are substantially constant, irrespective of the above geometry variation of the accelerometer 20.

Furthermore, with the described modulatable structure, it is possible to modulate the sensitivity of the sensor. In fact, for the accelerometer 20, Eq. (1) can be rewritten as $$\theta_{ext} = \frac{m \cdot a_{ext} \cdot x_m}{k} \quad (6)$$

where $\theta_{ext}$ is the rotation angle of the suspended region 21 due to the external acceleration $a_{ext}$, $m=m_0+m_1$ is the sum of mass $m_0$ of the central region and mass $m_1$ of the lateral regions 23, $x_m$, is the modulatable arm of the suspended region, and k is the elasticity of the elastic connection regions 25.

The sensitivity is thus proportional to the arm $x_m$, in turn, correlated to the ratio between masses $m_0$ and $m_1$ (which is the greater, the greater the lateral mass $m_1$ with respect to the central mass $m_0$) as well as to the displacement of the lateral masses 23. To increase the sensitivity, then, the suspended region 21 can be designed so that $m_0 \ll m_1$, for example for a same total mass m as in known solution of FIG. 1.

According to a different embodiment of the described driving method, detection of the external acceleration $a_{ext}$ may be made by displacing the lateral regions 23 between two positions, none of which is the rest position.

For instance, detection of the capacitance associated with the capacitive sensing elements 37 can be made in two steps characterized by displacement of the centroid into two positions (B2, B3) arranged on opposite sides of the first axis S1, as shown in FIGS. 3 and 4.

In fact, in this case, reading the capacitive variation associated with the capacitive sensing elements 37 with respect to the rest position (with no driving) in a first modulated-arm position, for example, in the position of FIG. 3, yields the value $$\Delta C'_{o1} = \Delta C_a + \Delta C_{stress} \quad (7)$$

and reading the capacitive variation associated with the capacitive sensing elements 37 with respect to the rest position in a second modulated-arm position, for example, in the position of FIG. 4, yields the value $$\Delta C'_{o2} = -\Delta C_a + \Delta C_{stress} \quad (8)$$

By subtracting Eq. (8) from Eq. (7), it is thus possible also in this case to isolate just the capacitive variation $\Delta C_a$, due to the external acceleration $a_{ext}$.

According to yet a different embodiment, modulation of the geometrical configuration of the suspended region 21 may occur in continuous time mode, for example, by controlling the driving assemblies 40 via a sinusoidal signal at the frequency $f_m = \omega m/2\pi$. In this way, the arm $x_m$ and thus the position of the centroid B are modified in a continuous way according to a sinusoidal behavior.

The arm $x_m$, is thus given by $$x_m = X \cos(\omega_m t) \quad (9)$$

Writing the external acceleration as $$a_{ext} = a_0 \cos(\omega_{in} t) \quad (10)$$

(which comprises as particular case a dc external acceleration, with $\omega_{in}$ $\omega_{in}=0$), the moment exerted by the external acceleration $a_{ext}$ becomes $$k\theta = M_{ext} = m \cdot a_{ext} \cdot x_m = m \cdot X \cos(\omega_m t) \cdot$$
$$a_0 \cos(\omega_{in} t) = m \cdot a_0 \cdot X \cdot [\cos((\omega_m + \omega_{in})t) + \cos((\omega_m - \omega_{in})t)] \quad (11)$$

Figure 5:
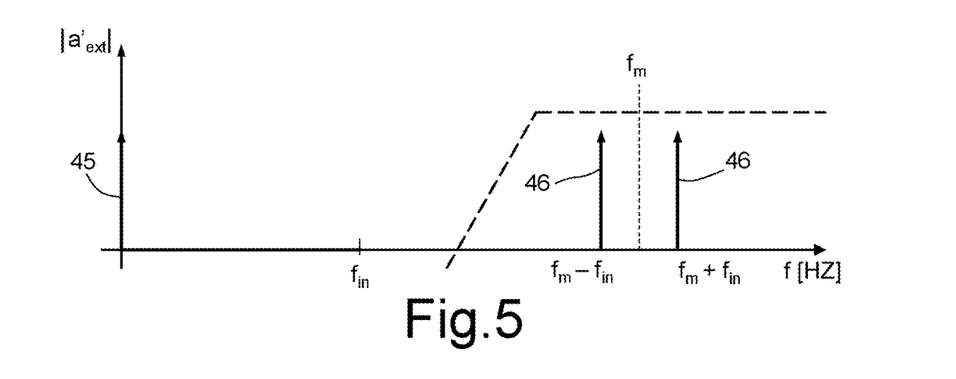
FIG. 5 is a representation in the frequency domain of signals obtainable with the accelerometer of FIGS. 2-4.

The moment exerted by the external acceleration $a_{ext}$ is thus equivalent to the moment exerted by an equivalent external acceleration $a'_{ext}$ modulated at a not zero frequency for a constant arm X. The transform of the equivalent external acceleration $a'_{ext}$ in the frequency domain is shown in FIG. 5 and has two harmonic components (indicated by the arrows 46) at the frequencies $(\omega_m + \omega_{in})$ and $(\omega_m - \omega_{in})$. By appropriately choosing the modulation frequency $f_m = \omega m/2\pi$ of the driving voltage supplied to the driving assemblies 40, for example, equal to the resonance frequency of the suspended mass 21, the components of the equivalent external acceleration signal may have a frequency very different from the zero frequency of the signal due to stress, represented in FIG. 5 by an arrow 45, which can thus be eliminated by a simple filter. Modulation of the external acceleration indeed may also give rise to low-frequency components (not shown), which are not distinguishable from the stress signal; their elimination does not, however, create problems, since the desired information of external acceleration may be obtaining from the high-frequency components.

Figure 7:
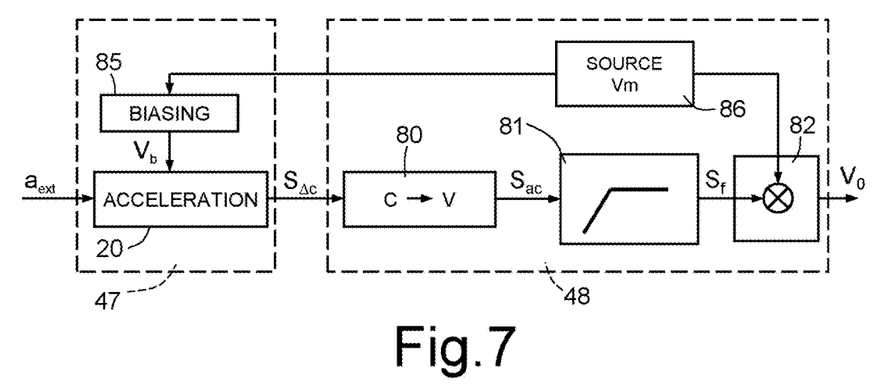
FIG. 7 shows a block diagram of a possible processing of the signal supplied by the present accelerometer, in case of continuous-time detection.

Demodulation of the equivalent acceleration signal may be carried out, for example, by a processing circuit 48 arranged downstream of the accelerometer 20, as shown in FIG. 7.

In FIG. 7, the accelerometer 20 is represented schematically by a block, receiving the external acceleration $a_{ext}$ and a biasing voltage $V_b$ generated by a driving circuit 85 from a modulation signal $V_m$ and supplied to the driving assemblies 40 (FIG. 2) for modulating the geometry of the suspended mass 21, as explained above. As mentioned, the driving voltage $V_m$ (as likewise the modulation signal $V_m$) is an ac voltage having a frequency $f_m = \omega m/2\pi$.

In the embodiment of FIG. 7, the processing circuit 48 comprises a modulation voltage source 86, a capacitance/voltage converter block 80, a high-pass filter 81, and a mixer 82. The modulation voltage source 86, the capacitance/voltage converter 80, the high-pass filter 81, and the demodulator 82 are provided in a different die, for example, an ASIC.

The modulation-voltage source 86 generates the modulation voltage $V_m$, also supplied to the demodulator 82.

The capacitance/voltage converter circuit 80 is a connection interface, formed, for example, by a charge amplifier connected to the capacitive sensing elements 37 of the accelerometer 20 (FIG. 2).

Figure 8:
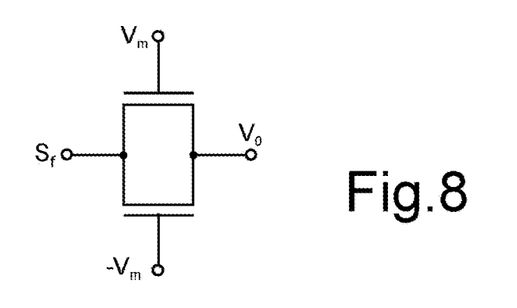
FIG. 8 shows a circuit equivalent of a component of the block diagram of FIG. 7.

The mixer 82 is, for example, implemented as a pair of MOS transistors, as illustrated in the detail of FIG. 8.

In the circuit of FIG. 7, a capacitive variation signal $s_{\Delta c}$ generated by the capacitive sensing elements 37, after conversion into a signal $s_{ac}$ by the C/V converter 80, is filtered by the high-pass filter 81 and demodulated in the mixer 82. The output signal $V_0$, correlated to the external acceleration $a_{ext}$ alone, can subsequently be processed in a known way.

Figure 9:
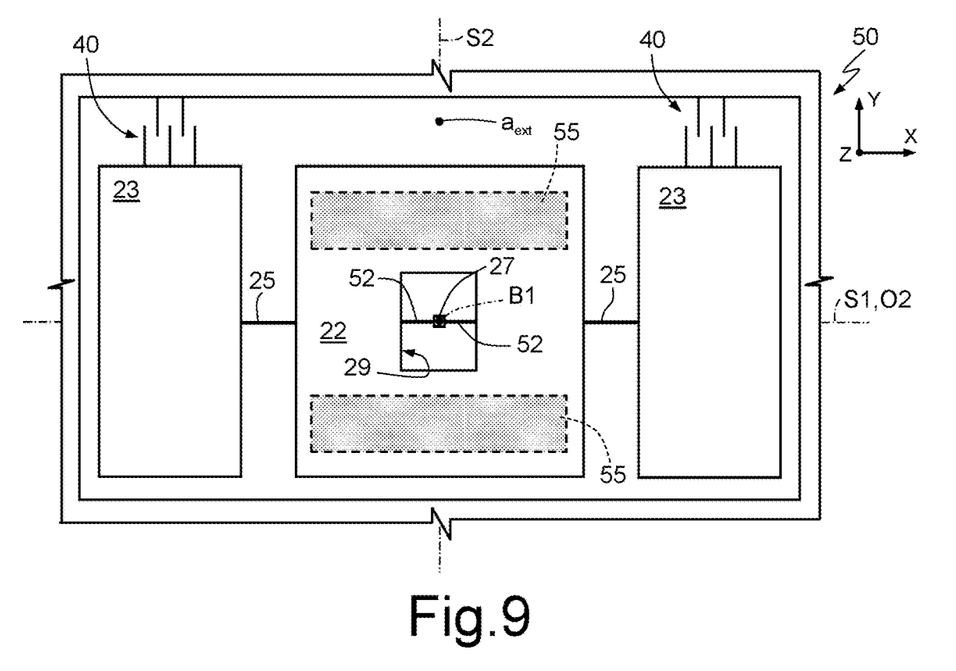
FIG. 9 is a top plan view of a different embodiment of the present accelerometer, for detecting out-of-plane accelerations, in a first operating position.
Figure 10:
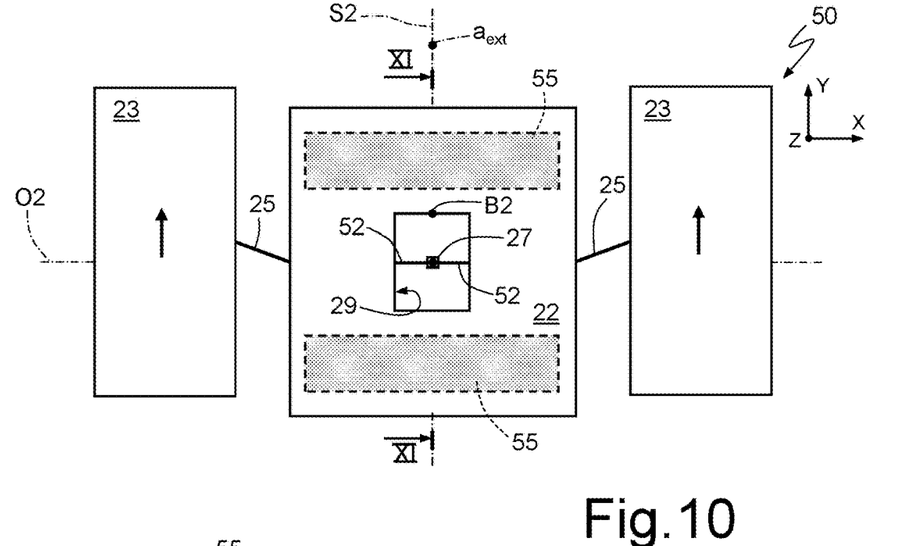
FIG. 10 is a schematic top plan view of the accelerometer of FIG. 9, in a second operating position.
Figure 11:
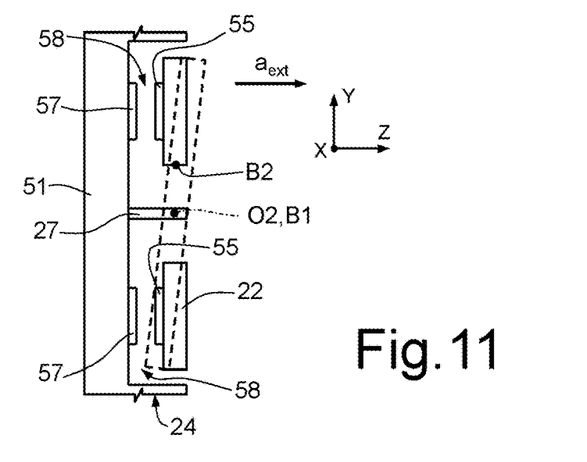
FIG. 11 is a cross-section taken along section plane XI-XI of FIG. 10.

FIGS. 9-11 show an embodiment of an accelerometer 50 that is designed to detect external accelerations perpendicular to the drawing planes of FIGS. 9 and 10 (which may be approximated with the plane of the suspended region, due to its small thickness). In the illustrated example, the accelerometer 50 is configured to detect accelerations directed parallel to an axis Z belonging to a Cartesian reference system XYZ.

The accelerometer 50 has a structure as a whole similar to the accelerometer 20 of FIGS. 2-4, except for the type of movement allowed to the suspended region and thus for the position of the sensing electrodes. The elements in common with the accelerometer 20 will thus be designated by the same reference numbers and will not be described any further herein.

In detail, in the accelerometer 50, the central region 22 is anchored to the substrate 51 (visible in FIG. 11) belonging to the supporting region 24 via the anchorage 27 and a pair of springs 52, which are configured to allow rotation of the suspended mass 21 about an axis of the ideal plane defined by the suspended mass 21. Here central region 22 is rotatable about a rotation axis O2 parallel to axis X, and the springs 52 are torsion springs, extending parallel to axis X.

In addition, mobile sensing electrodes 55 are arranged on the bottom surface 56 of the central region 22 (see in particular FIG. 11) and face respective fixed sensing electrodes 57, arranged on the substrate 51. Also here, the mobile sensing electrodes 55 and the fixed sensing electrodes 57 form capacitive sensing elements 58 (FIG. 11).

Also in the embodiment of FIGS. 9-11, the suspended region 21 has a arm b that may be modulated, and the measure may be carried out in discrete time mode (electromechanical chopping) or in continuous time mode (electromechanical modulation).

In detail, in the discrete time measure mode, the lateral regions 23 are driven by the driving assemblies 40 (FIG. 9) between a rest position, shown in FIG. 9, where the suspended region 21 has a configuration symmetrical with respect to both axes 51 and S2, and the arm b (distance between the centroid B and the rotation axis O2) is zero, and a measure position, shown in FIG. 10, where the suspended region 21 has a non-symmetrical configuration with respect to the first axis 51, and the arm b is thus non-zero.

In the rest position (FIG. 9 and FIG. 11 with solid line), due to the symmetry of the suspended region 21 and the presence of a zero arm b, an external acceleration $a_{ext}$ does not cause any rotation of the suspended region 21 about the rotation axis O2. Any possible rotations are thus only due to stresses, which may be detected through the capacitive sensing elements 58.

Instead, in the measure position (illustrated, for example, in FIG. 10 and in FIG. 11 with a dashed line), due to the displacement of the centroidal axis B1 with respect to the rotation axis O2 and the presence of a non-zero arm b, the suspended region 21 turns both as a result of the external acceleration $a_{ext}$ and as a result of the stresses (see in particular FIG. 11).

As described previously, for the detection of external in-plane accelerations, through a two-step detection, at rest and in a measure position, and acquiring the corresponding capacitive variation values, it is possible to eliminate the effect of the stresses, as discussed in detail above.

Also in this case, as an alternative to the above, detection of the capacitive variation values may be made discrete-time in two translated positions.

In the continuous-time measure mode, the lateral regions 23 are driven by the driving assemblies 40 (FIG. 9) continuously, via a sinusoidal driving signal. As described above, by filtering the obtained signal and demodulating it with the processing circuit 48, it is possible to obtain the value of the external acceleration $a_{ext}$.

Figure 12:
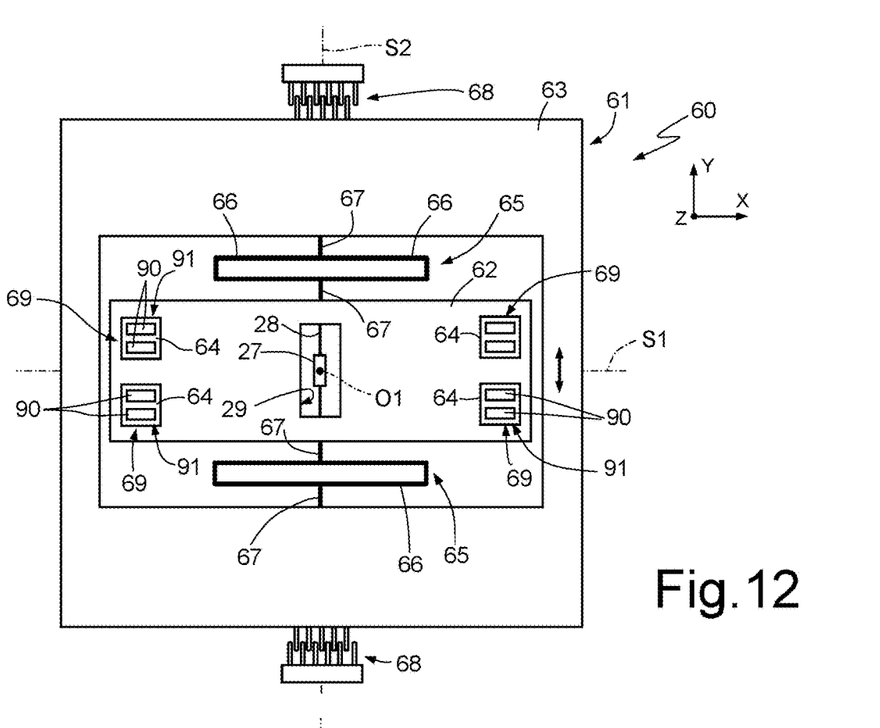
FIG. 12 is a top plan view of a different embodiment of the present accelerometer, for detecting in-plane accelerations.

FIG. 12 shows an embodiment of an accelerometer 60 designed to detect in-plane external accelerations. In the illustrated example, the accelerometer 60 is configured to detect external accelerations $a_{ext}$ parallel to an axis X belonging to a Cartesian reference system XYZ.

The accelerometer 60 comprises a suspended region 61 symmetrical, in the rest position, both with respect to a first axis S1 parallel to axis X and with respect to a second axis S2 parallel to axis Y.

In the accelerometer 60, the lateral regions are formed by a single frame (designated by 63), which has a quadrangular shape and surrounds a central region 62. The frame 63 is carried by the central region 62 through elastic connection regions 65, which extend along the second axis S2. Specifically, each elastic connection region 65, with a symmetrical configuration with respect to the second axis S2, has a pair of U-shaped portions 66, turned over with respect to each other and facing each other so as to form, together, the perimeter of a rectangle, two sides whereof are connected, in a median position, to the central region 62 and, respectively, to an inner side of the frame 63 via rectilinear portions 67. In this way, the elastic connection regions 65 allow translation of the frame 63 with respect to the central region 62 along axis Y, as in the case of the lateral regions 23 of FIGS. 2-4 and 9-10.

Driving assemblies 68 are coupled on two outer opposite sides of the frame 63, for controlling translation of the frame 63 between a rest position and a measure position, or between two opposite measure positions, as in the case of the lateral structures 63.

Fixed sensing electrodes 90 are here formed within the perimeter of the central region 62. The fixed sensing electrodes 90, formed by conductive regions, for example, of metal and carried by portions projecting from the substrate (not illustrated), extend within openings 64 formed in the central region 62 and face corresponding walls 91 of the central region 62. The fixed sensing electrodes 90 define mobile sensing electrodes and thus form, with the walls 91, capacitive sensing elements 69. In this way, in each opening 64, two capacitive sensing elements 90 are present, designed to have opposite capacitive variations as a result of stresses and external accelerations.

Figure 13:
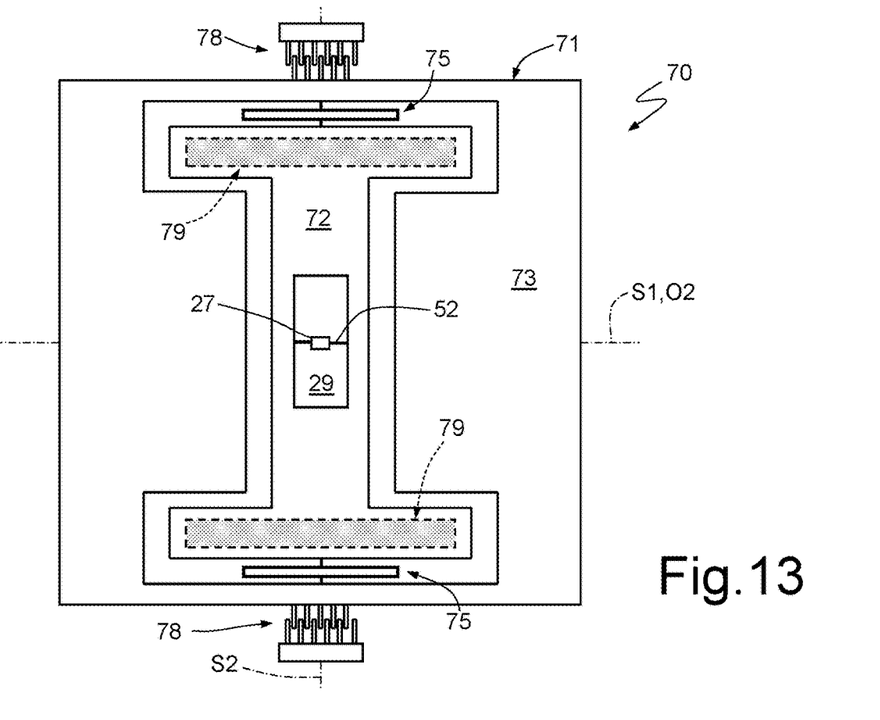
FIG. 13 is a top plan view of another embodiment of the present accelerometer for detecting out-of-plane accelerations.

FIG. 13 shows an embodiment of an accelerometer 70 designed to detect out-of-plane external accelerations. In the illustrated example, the accelerometer 70 is configured to detect external accelerations $a_{ext}$ parallel to an axis Z belonging to a Cartesian reference system XYZ.

The accelerometer 70 has a frame 73 similar to FIG. 12, and thus surrounding the central region 72, and the latter is shaped like a rotated H. The accelerometer 70 further comprises elastic connection regions 75 and driving assemblies 78 shaped like the respective elements 65 and 68 of FIG. 12. Furthermore, capacitive sensing elements 79 are likewise shaped like the corresponding elements 58 of FIGS. 9-11.

Figure 14:
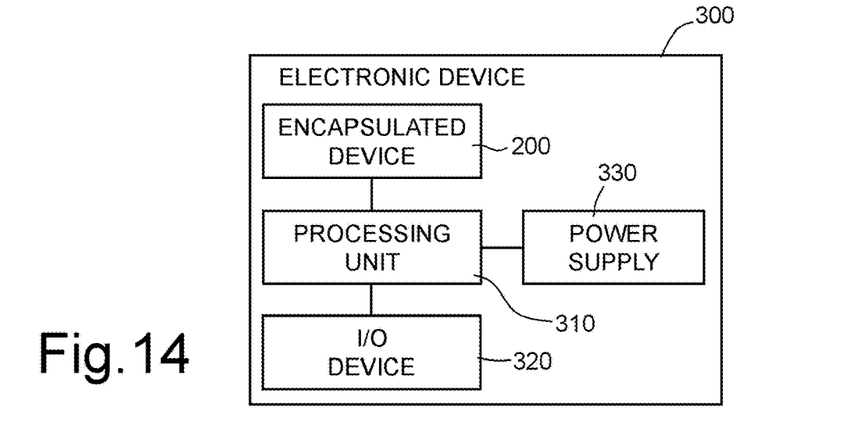
FIG. 14 shows a block diagram of an electronic apparatus including the present accelerometer.

FIG. 14 shows a block diagram of an electronic device 300, which comprises an accelerometer, such as one of accelerometers 20, 60, 70, referred to here as encapsulated device 200. The accelerometer may, for example, be used to detect vibrations, determine orientation of the electronic device, or recognize free-fall conditions.

The electronic device 300 may be a mobile communication apparatus, such as a cellphone and a personal digital assistant, a portable computer, a desktop computer, a photo or video camera device, a wearable device, such as a smartwatch, or any other electronic device. The electronic device 300 comprises a processing unit 310 and the encapsulated device 200, electrically coupled to the processing unit 310. The processing unit 310 includes control circuitry, including, for example, one or more processors, discrete memory and logic, including the processing circuit 48 of FIG. 7. The processing unit 310 is configured to transmit and receive signals to/from the encapsulated device 200. The electronic device may further comprise an input/output device 320, for example, a keypad or a display coupled to the processing unit 310. The electronic device 300 may further comprise a power supply 330, which may be a battery or components for coupling to an external supply source.

The described accelerometer allows detection of external accelerations in a very accurate way, thanks to the possibility of eliminating the dc components that adversely affect stability and precision of measure.

The accelerometer may be arranged in the same cavity as the gyroscopes, when the apparatus includes both these devices, thus enabling a reduction of the space.

The described accelerometer has a high stiffness and thus a high robustness as regard stiction of the mobile electrodes against the fixed elements of the structure.

Finally, it is clear that modifications and variations may be made to the device and method described and illustrated herein, without thereby departing from the scope of the present disclosure. For instance, the various described embodiments may be combined so as to provide further solutions.

Furthermore, the lateral regions 23 (and the frame 63, 73) may be mobile with a generic movement of roto-translation (including rotation) with respect to the central region 22, 62, 72.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   detecting an external acceleration including:
      driving a suspended region including a first mobile mass and a central mass, the suspended region being mobile with respect to a supporting structure, driving the suspended region includes moving the suspended region from at least one first geometrical configuration in a first sensing step to a second geometrical configuration different to the first geometrical configuration in a second sensing by moving the first mobile mass and a first electrode of the driving assembly coupled to a sidewall of the first mobile mass from the first geometrical configuration to the second geometrical configuration by applying a variable driving voltage to a second electrode of the driving assembly on a sidewall of the supporting structure;
      acquiring first and second position measure signals correlated to the first geometrical configuration of the suspended region in the first sensing step and to the second geometrical configuration of the suspended region in the second sensing step, respectively; and
      processing the first and second position measure signals and generating an accelerometric signal independent of spurious displacements of the suspended region with respect to the supporting structure.

2. The method according to claim 1, wherein:
   driving the suspended region includes rotating the central mass anchored to the supporting structure by driving the first mobile mass from a first position in the first geometrical configuration to a second position in the second geometrical configuration, the first mobile mass is coupled to the central mass through elastic connection elements configured to allow a relative movement of the first mobile mass with respect to the central mass; and
   rotating the central mass includes rotating the central mass out of plane relative to first mobile mass.

3. The method according to claim 2, wherein applying the variable driving voltage comprises supplying a first driving voltage in the first sensing step and a second driving voltage in the second sensing step, the method further comprising:
   generating an acceleration signal as a difference between the first and second position-measure signals.

4. The method according to claim 2, wherein applying the variable driving voltage comprises supplying an alternating current (AC) driving voltage, and the first and second position-measure signals are samples of an AC measure signal, the method further comprising:
   filtering the AC measure signal with a high-pass filter for generating a filtered signal without direct current (DC) components; and
   demodulating the filtered signal.

5. A method, comprising:
   detecting an external acceleration with an accelerometer including a suspended region having a first mobile mass, a second mobile mass, and a central mass anchored to a surface of a supporting region, detecting the external acceleration including:
      acquiring a first signal when the first mobile mass is in a first position and the second mobile mass is in a second position, the first signal is acquired from a sensing element coupled to the central mass of the accelerometer, the central mass is positioned between the first mobile mass and the second mobile mass, the central mass separates the first mobile mass from the second mobile mass, and a plurality of elastic connection elements couples the central mass to the first mobile mass and the second mobile mass;
      driving the first mobile mass to a third position different from the first position by applying a first variable driving voltage to a first driving assembly of the accelerometer coupled to a first sidewall of the first mobile mass transverse to the surface, and driving the second mobile mass to a fourth position different from the second position by applying a second variable driving voltage to a second driving assembly of the accelerometer coupled to a second sidewall of the second mobile mass transverse to the surface, the central mass rotating in response to driving the first mobile mass to the third position and driving the second mobile mass to the fourth position;
      acquiring a second signal when the first mobile mass is in the third position and the second mobile mass is in the fourth position, the second signal is acquired from the sensing element coupled to the central mass of the accelerometer; and
   generating an accelerometric signal based on the first signal and the second signal.

6. The method according to claim 5, wherein driving the first mobile mass to the third position different from the first position by applying the first variable driving voltage to the first driving assembly coupled to the first mobile mass further comprises:

driving a first fixed driving electrode of the first driving assembly coupled to a sidewall of a supporting region of a substrate of the accelerometer.

7. The method according to claim 6, wherein driving the second mobile mass to the fourth position different from the second position by applying the second variable driving voltage to the second driving assembly coupled to the second mobile mass further comprises:

driving a second fixed driving electrode of the second driving assembly coupled to the supporting region of the substrate of the accelerometer.

8. The method according to claim 7, wherein:

driving the first driving assembly of the accelerometer further comprises attracting a first mobile driving electrode of the first driving assembly coupled to the first sidewall first mobile mass to the first fixed driving electrode when the first driving assembly is driven; and driving the second driving assembly of the accelerometer further comprises attracting a second mobile driving electrode of the second driving assembly coupled to the second sidewall of the second mobile mass to the second fixed driving electrode when the second driving assembly is driven.

9. The method according to claim 7, wherein:

driving the first driving assembly of the accelerometer further comprises repelling a first mobile driving electrode of the first driving assembly coupled to the first mobile mass from the first fixed driving electrode when the first driving assembly is driven; and driving the second driving assembly of the accelerometer further comprises repelling a second mobile driving electrode of the second driving assembly coupled to the second mobile mass from the second fixed driving electrode when the second driving assembly is driven.

10. The method according to claim 5, wherein the central region is rotatably coupled to an anchorage coupled to a substrate of the accelerometer.

11. The method according to claim 10, wherein the anchorage is positioned at a center of the central mass.

12. The method according to claim 10, wherein a plurality of elastic suspension elements couples the central mass to the anchorage.

13. The method according to claim 10, wherein the central mass rotating in response to driving the first mobile mass to the third position and driving the second mobile mass to the fourth position further comprises rotating the central mass about the anchorage coupled to the substrate of the accelerometer.

14. The method according to claim 5, wherein generating the accelerometric signal further comprises determining a difference between the first signal and the second signal.

15. The method according to claim 5, wherein a centroid of the first mobile mass, the second mobile mass, and the central mass is in a fifth position when the first mobile mass is in the first position and the second mobile mass is in the second position, and the centroid is in a sixth position when the first mobile mass is in the third position and the fourth mass is in the fourth position.

16. The method of claim 5, wherein driving the first mobile mass to the third position and driving the second mobile mass to the fourth position includes applying a variable driving voltage to a driving assembly.

17. A method, comprising: detecting an external acceleration with an accelerometer including a suspended region anchored to a surface of a supporting region and suspended over the supporting region, the suspended region including a mobile mass and a central mass coupled to the mobile mass by a plurality of elastic connection elements and anchored to the surface, detecting the external acceleration with the accelerometer including: acquiring a first signal when the mobile mass is in a first position, the first signal is between a mobile sensing electrode coupled to the central mass and a fixed sensing electrode coupled to a substrate of the accelerometer; driving the mobile mass from the first position to a second position different from the first position by moving the mobile mass and a first electrode of an electrode driving assembly coupled to a first sidewall of the mobile mass transverse to the surface from the first position to the second position by applying a variable driving voltage to a second electrode of the electrode driving assembly coupled to a second sidewall of the supporting region transverse to the surface, the central mass rotating in response to driving the mobile mass from the first position to the second position; acquiring a second signal between the mobile sensing electrode and the fixed sensing electrode when the central mass is rotated; and generating an accelerometric signal based on the first signal and the second signal.

18. The method according to claim 17, wherein rotating the central mass further comprises:

rotating the central mass about an anchorage coupled to a substrate of the accelerometer, the central mass is rotatably coupled to the anchorage and the anchorage is positioned at a center of the central mass.

19. The method according to claim 18, wherein the mobile mass is coupled to the central mass by an elastic connection element and the central mass is coupled to the anchorage by an elastic suspension element.

20. The method according to claim 17, further comprising driving the mobile mass of the suspended region from the second position to the first position by driving the electrode driving assembly coupled to the mobile mass and the substrate by applying the variable driving voltage to the electrode driving assembly.

21. The method according to claim 17, wherein the suspended mass has a centroid in a third position when the mobile mass is in the first position, and the centroid is in a fourth position when the mobile mass is in the second position.

22. The method of claim 1, wherein the central mass is inset within an opening in the first mobile mass.

* * * * *

UNITED STATES PATENT AND TRADEMARK OFFICE
CERTIFICATE OF CORRECTION

PATENT NO. : 11,408,904 B2
APPLICATION NO. : 16/726024
DATED : August 9, 2022
INVENTOR(S) : Alessandro Tocchio et al.

It is certified that error appears in the above-identified patent and that said Letters Patent is hereby corrected as shown below:

In the Claims

<u>In Column 11, Claim 1, Line 50:</u>
"second sensing by moving" should read: --second sensing step by moving--.

Signed and Sealed this
Seventeenth Day of January, 2023

Katherine Kelly Vidal
*Director of the United States Patent and Trademark Office*